(12) United States Patent
Shand

(10) Patent No.: US 7,366,099 B2
(45) Date of Patent: Apr. 29, 2008

(54) METHOD AND APPARATUS FOR SYNCHRONIZING A DATA COMMUNICATIONS NETWORK

(75) Inventor: Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 10/725,831

(22) Filed: Dec. 1, 2003

(65) Prior Publication Data

US 2005/0117593 A1  Jun. 2, 2005

(51) Int. Cl.
- *G01R 31/08* (2006.01)
- *H04J 1/16* (2006.01)
- *H04L 1/00* (2006.01)
- *H04L 12/26* (2006.01)

(52) U.S. Cl. ............ 370/235; 370/254; 370/255; 370/400; 370/351; 370/401; 370/503; 370/512; 370/324; 370/350; 370/328; 370/509

(58) Field of Classification Search ............ None
See application file for complete search history.

(56) References Cited

U.S. PATENT DOCUMENTS

| | | | |
|---|---|---|---|
| 5,243,592 A | | 9/1993 | Perlman et al. |
| 5,253,248 A | | 10/1993 | Dravida et al. |
| 5,943,326 A | * | 8/1999 | Schroderus ............ 370/324 |
| 5,999,286 A | | 12/1999 | Venkatesan |
| 6,278,687 B1 | | 8/2001 | Hunneyball |
| 6,377,542 B1 | | 4/2002 | Asprey |
| 6,535,481 B1 | | 3/2003 | Andersson et al. |
| 6,578,084 B1 | | 6/2003 | Moberg et al. |
| 6,578,086 B1 | | 6/2003 | Regan et al. |
| 6,590,868 B2 | | 7/2003 | Shen |
| 6,636,498 B1 | | 10/2003 | Leung |
| 6,668,282 B1 | | 12/2003 | Booth et al. |
| 6,697,325 B1 | | 2/2004 | Cain |
| 6,944,131 B2 | | 9/2005 | Beshai et al. |
| 6,982,951 B2 | | 1/2006 | Doverspike et al. |
| 9,009,286 | | 8/2006 | Swallow |
| 7,113,481 B2 | | 9/2006 | Elie-Dit-Cosaque et al. |
| 2002/0093954 A1 | | 7/2002 | Weil et al. |

(Continued)

OTHER PUBLICATIONS

International Searching Authority, International Search Report, PCT/US04/33827, dated Mar. 28, 2005, 8 pages.

(Continued)

*Primary Examiner*—Chi Pham
*Assistant Examiner*—Raj K. Jain
(74) *Attorney, Agent, or Firm*—Hickman Palermo Truong & Becker LLP

(57) ABSTRACT

A method is disclosed for synchronizing a data communications network. The data communications network comprises a plurality of existing nodes forming one or more synchronization domains and a node entering the network. Each existing node in a synchronization domain stores a common representation of the synchronization domain and is configured to flood the synchronization domain with domain representation information. In a synchronization domain identification step formed at the entering node, the entering node exchanges entering node domain representation information with a first neighboring existing node. The entering node identifies as a first synchronization domain common with the first neighboring existing node all neighboring existing nodes from which the entering node domain representation information is flooded back the entering node.

38 Claims, 7 Drawing Sheets

U.S. PATENT DOCUMENTS

| | | | |
|---|---|---|---|
| 2002/0116669 | A1 | 8/2002 | Jain |
| 2003/0016655 | A1* | 1/2003 | Gwon ........................ 370/352 |
| 2003/0095504 | A1* | 5/2003 | Ogier ........................ 370/235 |
| 2004/0085894 | A1 | 5/2004 | Wang et al. |
| 2005/0031339 | A1 | 2/2005 | Qiao et al. |
| 2007/0011284 | A1 | 1/2007 | Le Roux et al. |

OTHER PUBLICATIONS

Wang, Zheng et al., "Shortest Path First with Emergency Exits," ACM 089791-405-8/90/0009/0166, 1990, pp. 166-176.

M. Watari, "Masafumi Watari's Web Site," "Papers" page, printed May 7, 2003, http://www.sfc.wide.ad.jp/~watari/papers.html, 1 page.

C. Perkins, "IP Mobility Support for IPv4," Jan. 2002, IETF Network Working Group Request for Comments 3220 (RFC 322), from www.ietf.org, pp. 1-98.

S. Deering, et al., "Internet Protocol, Version 6 (IPv6), Specification," Dec. 1998, IETF Network Working Group Request for Comments 2460, from www.ietf.org, pp. 1-39.

University of Southern California, Information Sciences Institute, "Internet Protocol, DARPA Internet Program, Protocol Specification," Sep. 1981 (IETF RFC 791), 48 pages.

D. Johnson, et al., "Mobility Support in Ipv6, draft-ietf-mobileip-ipv6-21.txt," Feb. 26, 2003, http://www.ietf.org/html.charters/mobileip-charter.html, pp. 1-169.

Ryuji Wakikawa, et al., "Mobility Related Research at the InternetCAR Project," http://www.connectathon.org/talks03/cthon-keio.pdf, Mar. 5, 2003, 12 pages.

William Stallings, "Mobile IP," http://www.cisco.com/warp/public/ipi_4-2_ip.html, 11 pages, Oct. 26, 2001.

Cisco Systems, Inc., "White Paper, *Cisco Mobile IP*, Executive Summary," 2002, http://www.cisco.com/warp/public/cc/pd/10sw/prodlit/mbxul_wp.htm, 8 pages.

Cisco Systems, Inc., "Configuring Mobile IP," http://www.cisco.com/warp/public/732/Tech/mobile/IP/techdocument, 2003, 38 pages.

Mikkel Thorup, "Fortifying OSPF/IS-IS against link-failure," Sep. 7, 2001, pp. 1-10.

Fei Dai et al., "On Independently Finding Converging Paths in Internet," 2001, pp. 1-13.

Paolo Narváez et al., "Local Restoration Algorithm for Link-State Routing Protocols," 1998, 6 pages.

Jie Wu et al., "An Extended Fault-Tolerant Link-State Routing Protocol in the Internet," 2001, 7 pages.

Paolo Narváez et al., "Fault-Tolerant Routing in the Internet without Flooding," 1998, pp. 1-13.

Takuya Yoshihiro, "Design and Analysis of Routing Algorithms toward the Next Generation Internet," Dec. 2002, 98 pages.

Fortz, Bernard, et al., "Optimizing OSPF/IS-IS Weights in a Changing World," IEEE JSAC Special Issue on Advances in Fundamentals of Network Management, Spring 2002, pp. 1-31.

Thorup, Mikkel, et al., "Avoiding Ties in Shortest Path First Routing," AT&T Labs-Research, Shannon Laboratory, Florham Park, NJ, pp. 1-13, 2001.

Thorup, Mikkel, "OSPF Areas Considered Harmful," AT&T Labs-Research, Florham Park, NJ, Apr. 22, 2003, pp. 1-9.

M. Leelanivas, et al., "Graceful Restart Mechanism for Label Distribution Protocol," Feb. 2003, Network Working Group, Request for Comments: 3478, http://rfc3478.x42.com, data retrieved Apr. 28, 2004, pp. 1-11.

R. Balay, et al., "IS-IS Mesh Groups," Oct. 2000, Network Working Group, Request for Comments: 2973, pp. 1-8.

M. Shand, et al., Restart signaling for IS-IS, draft-ietf-isis-restart-05.txt, Jan. 2004, Network Working Group, Internet Draft, http://www.ietf.org/internet-drafts/draft-ietf-isis-restart-05.txt, data retrieved Apr. 28, 2004, pp. 1-20.

Amir Hermelin, et al., "Extending the Number of IS-IS LSP Fragments Beyond the 256 Limit, draft-ietf-isis-lsp-frags-02.txt," Network Working Group, Internet Draft, http://www.ietf.org/internet-drafts/draft-ietf-isis-ext-lsp-frags-02.txt, data retrieved Apr. 28, 2004, pp. 1-12.

M. Shand, et al., "Restart signaling for IS-IS, draft-ietf-isis-restart-04.txt," Jul. 2003, Network Working Group, Internet Draft, http://vesuvio.ipv6.tilab.com/internet-drafts/draft-ietf-isis-restart-04.txt, data retrieved Apr. 28, 2004, pp. 1-18.

U.S. Appl. No. 10/442,589, filed May 20, 2003, Stewart Frederick Bryant, et al., entitled "A Method and Apparatus for Constructing a Transition Route in a Data Communication Network," 45 pages.

U.S. Appl. No. 10/340,371, filed Jan. 9, 2003, Kevin George Miles, et al., entitled Method and Apparatus for Constructing a Backup Route in a Data Communications Network, 33 pages.

Cisco Systems, Inc., "Tunnel ToS," Cisco IOS Release 12.0(17)S, 12.0(17)ST, 12.2(8)T, and 12.2(14)S, Jan. 28, 2003, pp. 1-15.

Cisco Systems, Inc., "AppleTalk, IP, and Novell IPX Overview," Sep. 9, 2002, pp. IV-1-IV-6.

Cisco Systems, Inc., "Why Are OSPF Neighbors Stuck in Exstart/Exchange State?,"1992-2003, 8 pages.

Cisco Systems, Inc., "Trace," Chapter 32, Sep. 13, 2002, pp. 32-1-32-12.

U.S. Appl. No. 10/323,358, filed Dec. 17, 2002, Ian Michael Charles Shand, entitled "Method and Apparatus for Advertising a Link Cost in a Data Communications Network," 29 pages.

* cited by examiner

| DATA | SRM |
|------|-----|
| LSP1 | flag |
| LSP2 | flag |
| LSP3 | flag |
| LSP4 | flag |

FIG. 2

METHOD AND APPARATUS FOR SYNCHRONIZING A DATA COMMUNICATIONS NETWORK

FIELD OF THE INVENTION

The present invention generally relates to synchronizing a data communications network in particular following a change in the network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately. When there is a network change an LSP representing the change is flooded through the network, each node sending it to each adjacent node.

As a result, when a data packet for a destination node arrives at a node (the "first node"), the first node identifies the optimum route to that destination and forwards the packet to the next node along that route. The next node repeats this step and so forth.

As a result synchronization of a data communications network is extremely important. One particular type of network change where synchronization can be burdensome is when a new node enters the network for example by manual intervention or as part of a MANET (Mobile Ad hoc Network).

A known synchronization technique for a node entering a network is described in the Intermediate System-Intermediate System (IS-IS) protocol which is described in International Standard ISO/IIEC 10589 2002 clause 7.3. This can be understood referring to FIG. 1, which depicts an illustrative network diagram showing a conventional technique for synchronizing a data communications network. A network designated generally 10 comprises a plurality of nodes N1, N2, N3, N4 termed here "existing nodes" which are joined by respective links 12, 14, 16. A node N0, termed here the "entering node" enters the network 10 for example by coming into range of nodes in the network and forms links, say, with each of nodes N1 to N4 via respective links 18, 20, 22 and 24. It will be seen, as a result, that the network has changed and hence that the LSDBs of all of the nodes N0 to N4 need to be updated and synchronized.

FIG. 2 depicts a schematic diagram of an LSDB maintained at a node in the network. For illustrative purposes the LSDB of node N1 is shown but it will be appreciated that LSDBs are maintained at all other nodes as well. The LSDB is designated generally 210 and includes a first, data column 212 containing the LSPs: LSP1, LSP2, LSP3 and LSP4 of each existing node on the network prior to synchronization. The LSDB also contains a second, send routing message (SRM) flag column 214 in which a flag value is set against each LSP to indicate when synchronization is required. In the case of node N1 only a single SRM column is required as there is only a single interface, to node N2. However where a node has multiple interfaces then multiple respective SRM columns are used.

In the case of the entering node N0 the LSDB will have only one entry: its LSP, but on entry to the network and prior to synchronization, four SRM columns, one for each of the interfaces to the existing nodes in the network 210.

On entry into the network the entering node N0 exchanges hello messages with each of the existing nodes N1 to N4 and all SRM flags are set to 1 as a result of which each node sends the contents of its LSDB including all LSPs down the newly created interface. Upon receipt of each LSP the receiving node sends an acknowledgement message; if the acknowledgement message is not received then the SRM flag is not reset and the LSPs are resent until all nodes have all information and are synchronized. Where nodes N1 to N4 in fact form part of a larger network but are the only neighbor nodes to N0 then it can be assumed that nodes N1 to N4 are synchronized with the remainder of the network and will flood node N0's LSP throughout the network ensuring convergence of all nodes on a synchronized LSDB.

According to the conventional system the acknowledgment of receipt of an LSP is effected through the medium of a partial sequence number packet (psnp) which returns the contents of one or more LSP headers that have been received allowing multiple SRM flags to be reset to zero. In a further optimization to the conventional technique the acknowledgement takes the form of a complete sequence number packet (csnp) which is sent containing the header of all LSPs in the LSDB allowing synchronization to be completed by addressing any discrepancies between the csnp and the contents of the LSDB of a node receiving the csnp.

A problem with known approaches to synchronization lies in the duplication of information. In the approach described above node N0 synchronizes with each of nodes N1 to N4, but nodes N1 to N4 are already synchronized with one another by virtue of sharing the same network. As a result redundant information is swapped between the entering node and the existing nodes which can add to the cost of the operation.

This is particularly significant, in a mobile network such as MANET which is described in "Mobile Ad Hoc Networking (MANET): Routing Protocol Performance Issues and Evaluation Considerations" by S. Corson, J Macker, which is available at the time of writing on the file "rfc2501.txt" in the directory "rfc" of the domain "ietf.org" of the World Wide Web. Mobile ad hoc networking refers to networks in which nodes enter and leave regularly. For example, mobile ad hoc networking is encountered when wireless network devices come and go from within proximity to a wireless access point. Firstly by virtue of the mobility of the network elements, nodes will enter and leave the mobile network very quickly meaning that sequence synchronization is required. Furthermore it is desirable to reduce power consumption as far as possible on mobile devices and hence reduce the transmission data to a minimum. This is especially the case as mobile devices commonly have very low bandwidth.

However merely synchronizing with one existing node will give rise to problems if the entering node is in fact synchronizing with multiple independent synchronization domains, that is, the entering node enters a network having two sub-networks independent of each other.

BRIEF DESCRIPTION OF THE DRAWINGS

The present invention is illustrated by way of example, and not by way of limitation, in the figures of the accompanying drawings in which like reference numerals refer to similar elements and in which:

FIG. 2 is a diagram illustrating schematically an LSDB of a node in a network;

DETAILED DESCRIPTION OF THE PREFERRED EMBODIMENT

Figure 1:
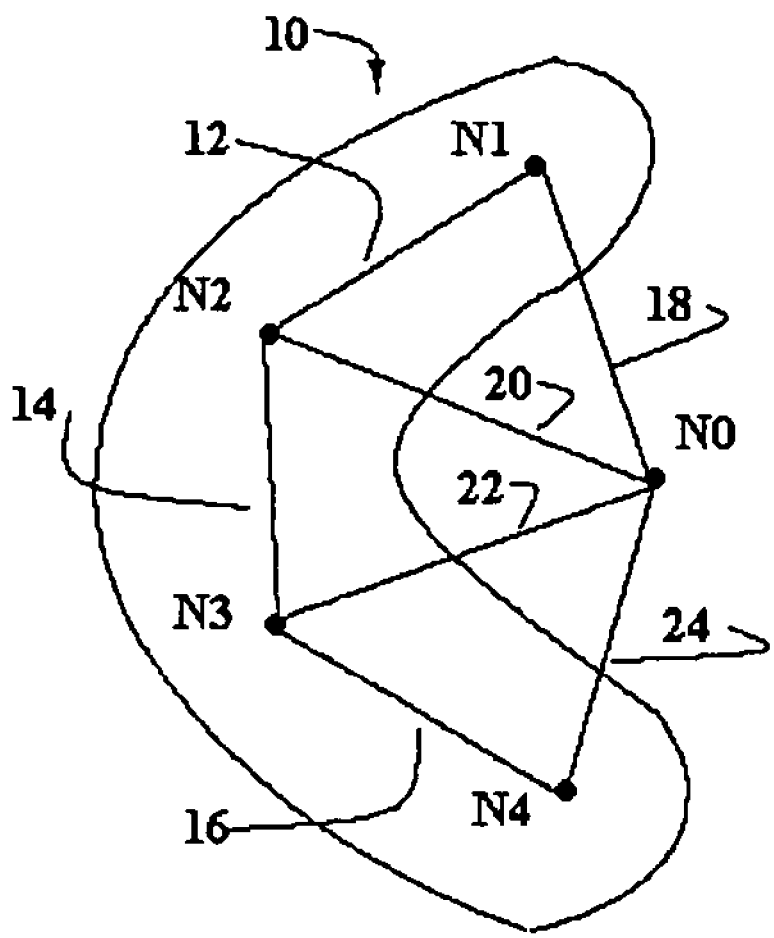
FIG. 1 is a representation of a network illustrating connection between existing nodes in a network and a node entering the network.

A method and apparatus for synchronizing a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Method of Synchronizing a Data Communications Network
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for synchronizing a data communications network comprising a plurality of existing nodes forming one or more synchronization domains and a node entering the network. Each existing node in a synchronization domain stores a common representation of the synchronization domain and is configured to flood the synchronization domain with domain representation information. In a synchronization domain identification step performed at the entering node, the entering node exchanges entering node domain representation information with a first neighboring existing node. The entering node identifies as a first synchronization domain common with the first neighboring existing node all neighboring existing nodes from which the entering node domain representation information is flooded back the entering node.

In other aspects, the invention encompasses a computer apparatus and a computer-readable medium configured to carry out the foregoing steps.

2.0 Structural and Functional Overview

In overview a synchronization method is provided in which a node entering a network of existing nodes and connecting with multiple neighbor nodes identifies a sub-set of existing nodes in the network in a common synchronization domain (termed here a "sub-network") and synchronizes with only one neighbor node in the sub-network, hence avoiding duplication of synchronization effort with the individual existing neighbor nodes in the sub-network which by definition are synchronized with each other already. In order to determine which neighbor nodes belong to a common sub-network, the entering node firstly selects a single neighbor node in the network it has entered and synchronizes with it, sending its own LSP. The LSP is then flooded as part of normal operation through all nodes in a common synchronization domain with the selected neighbor node including any other neighbor nodes in that synchronization domain. The LSP will thus be flooded back to the entering node from those neighbor nodes.

As a result those neighbor nodes that return that LSP to the entering node, together with the initially selected neighbor node can be identified as a sub-network representing a common synchronization domain such that all of the neighbor nodes in the sub-network will be synchronized with each other. Accordingly the entering node need only synchronize with the selected neighbor node in the sub-network. If any neighbors in the network containing the sub-network do not return the LSP, for example within a time out period, then the entering node synchronizes with each remaining neighbor node. Alternatively the entering node can select one of the remaining nodes, identify the sub-network to which it belongs in a manner described above and repeat the operation for any remaining nodes until all sub-networks have been synchronized with, including sub-networks in fact only containing one node.

In an optimization, as part of the hello exchange the entering node can request the LSDB size for each neighbor node and select the neighbor node with the largest LSDB size for sending an LSP. As there is a reasonable likelihood that the neighbor node with the largest LSDB is likely to be part of the largest sub-network, this approach ensures that duplication is reduced to a minimum.

Figure 3:
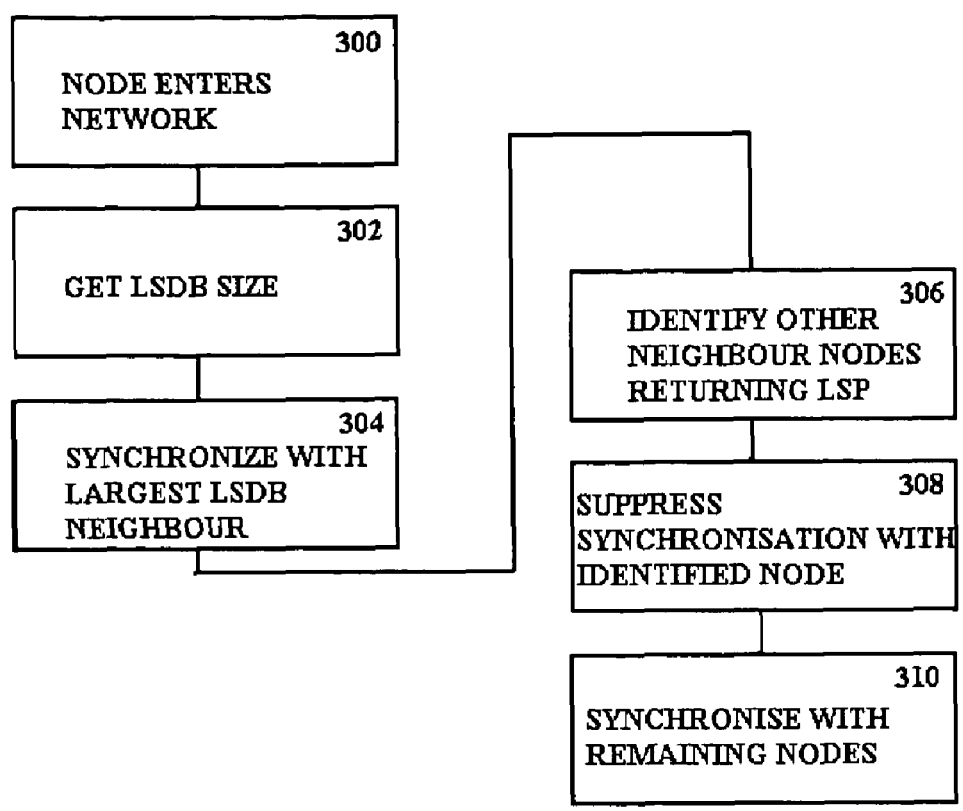
FIG. 3 is a flow diagram illustrating a high level view of a method for synchronizing a data communications network.

The method can be further understood with respect to FIG. 3 which is a flow diagram illustrating a high level view of a method of synchronizing a data communications network. In block 300 a node enters a network. In block 302 the entering node obtains the LSDB size of all neighboring nodes. In block 304 the entering node synchronizes with the neighbor node having the largest LSDB. As part of this process the entering node sends its LSP to the neighbor node and receives all of the neighbor node's LSDB in return. The neighbor node then floods the LSP. In block 306 the entering node identifies all other neighbor nodes through which the LSP returns. At block 308 the entering node suppresses synchronization with the identified set of neighbor nodes on the basis that they belong to the same synchronization domain. In block 310 the entering node synchronizes with the remaining nodes, either continuously or by returning to block 302 and starting in the synchronization process with the next largest remaining LSDB size neighbor node until all neighbors have been synchronized with.

In an alternative approach, rather than synchronizing with the selected neighbor node in an initial step, the entering node can send its LSP to the selected neighbor node without performing the remainder of the synchronization process and only carry out synchronization once the sub-network has been determined.

Figure 4:
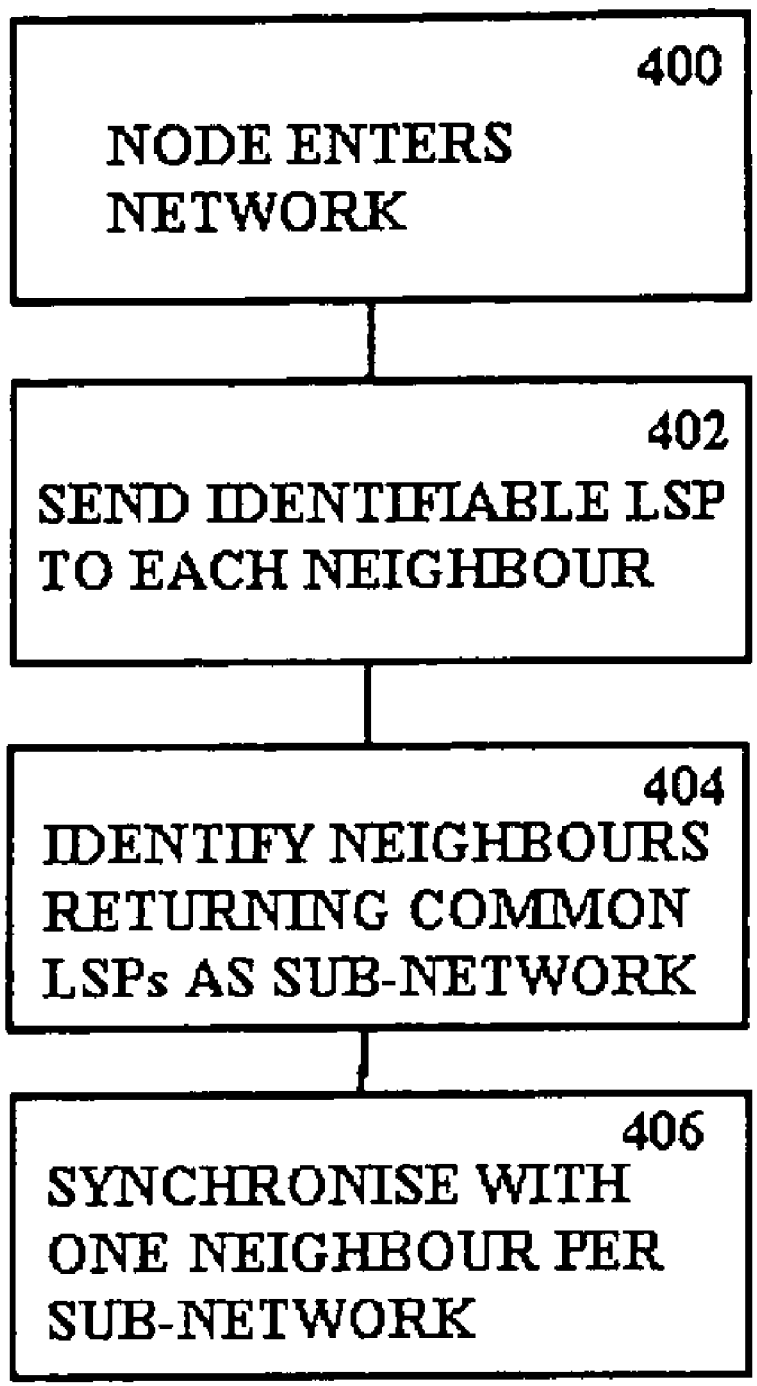
FIG. 4 is a flow diagram illustrating a high level view of an alternative method of synchronizing a data communications network.

Such an approach is appropriate for the alternative implementation described with reference to FIG. 4 which is a flow diagram illustrating a high level view of an alternative method of synchronizing a data communications network. In block 400 the entering node enters the network. In block 402 the entering node sends an individually identifiable LSP to each respective neighboring node. The individually identifiable LSP can be one of the set of LSPs which that node is permitted to generate and is identified by its own network address. In block 404 the entering node determines which neighbor nodes return a common individually identifiable LSP and identifies all such neighboring nodes as belonging to a common sub-network. It will be appreciated that all nodes in a sub-network domain will return all individually identifiable LSPs sent to each neighbor node in that domain and that neighbor nodes in separate sub-networks will not return any common LSPs. At block 406 the entering node synchronizes with one neighbor per sub-network. As a result all sub-networks are initially identified ensuring that duplication is minimized although the initial overhead of establishing the sub-networks is increased.

It will be seen that according to the method described herein, the amount of duplication involved during synchronization following a network change is reduced without the risk that synchronization only takes place in relation to a sub-network of the network as a whole.

3.0 Method of Synchronizing a Data Communications Network.

The method described herein can be implemented according to any appropriate routing protocol. Generally, link state protocols such as Intermediate System to Intermediate System (IS-IS) or Open Shortest Path First (OSPF) are appropriate protocols. Link state protocols of this type will be well understood by the skilled reader and are not described in detail here.

Figure 5:
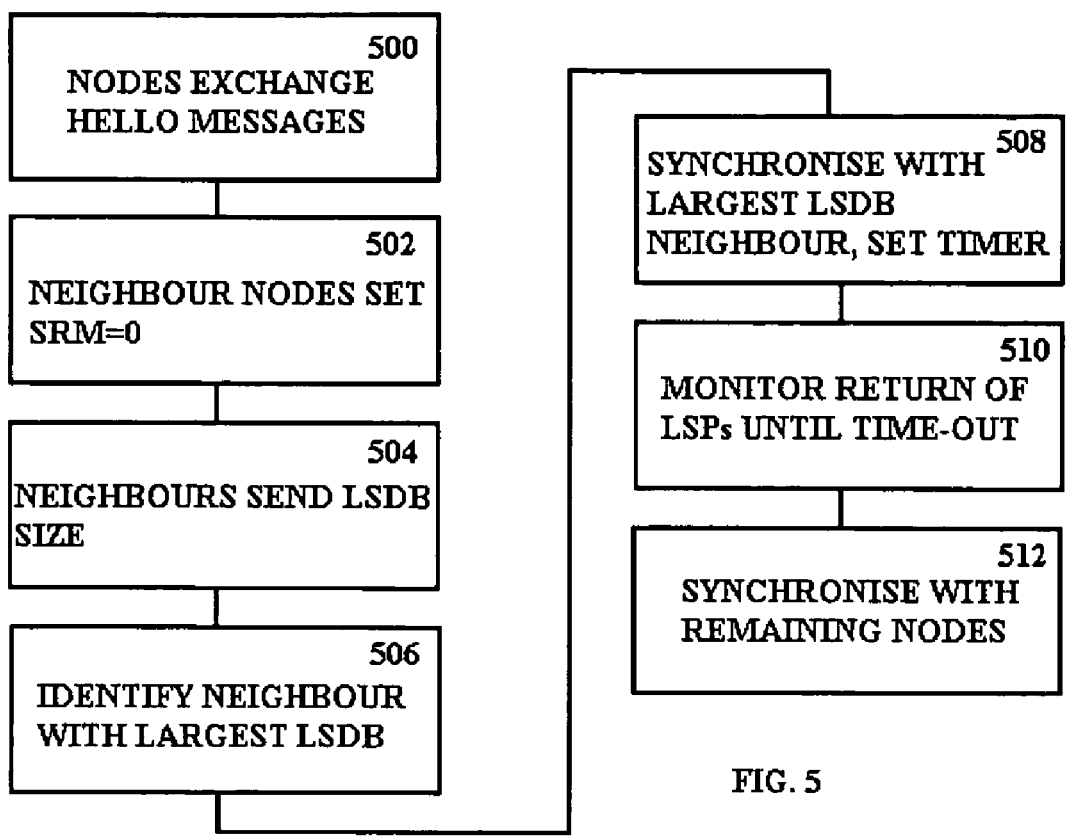
FIG. 5 is a flow diagram illustrating in more detail the steps involved in constructing a data communications network.

FIG. 5 is a flow diagram illustrating in more detail a method of synchronizing a data communications network. In block 500 the entering node exchanges hello messages with the neighbor nodes in the network. The hello message from the entering node includes an instruction not to set the SRM described above with reference to FIG. 2 to "1". In other words all neighboring nodes are instructed to suppress the synchronization routine and this is reflected in block 502. In block 504 as part of the hello exchange the neighbor nodes send their respective LSDB sizes. In block 506 the entering node identifies the neighbor node with the largest LSDB. In block 508 the entering node synchronizes with the neighbor node with the largest LSDB and sets a timer. The timer is set, for example, for a period of between 1 and 5 seconds. In block 510 the entering node monitors for return of the LSP from all neighbor nodes until the timer times out.

All neighbors returning the LSP are identified as belonging to a common sub-network with the neighbor having the largest LSDB such that there is no requirement for repeat of the synchronization process for any of them. In practice this can be achieved by suppressing setting the relevant SRM flags to "1" in the entering node. In block 510 the entering node synchronizes with the remaining nodes not belonging to the synchronization domain already identified. As discussed above this can either be done by repeating steps 506 to 508 for the remaining nodes until all sub-networks have been identified or, in view of the prolonged time-out period that this could give rise to, synchronizing with the remaining nodes simultaneously.

In the alternative optimization discussed above the entering node identifies all sub-networks in parallel by sending individually identifiable LSPs to each neighbor and monitoring which neighbors return which own LSPs. In a further optimization the entering node can send separate fragments of its LSP and maintaining a table listing which neighbor received which fragment allowing simple identification of each sub-network. Synchronization with one neighbor from each sub-network can then be carried out in parallel reducing the processing time.

Although the above discussion is presented in relation to a node entering a network it will be seen that the method extends to synchronizing two networks joining together. In that case, for example, the node with the smaller LSDB will control synchronization with one neighbor node from the other network, the system then relying on propagation of the respective LSDBs through each network for convergence.

Where, during synchronization, a new adjacency appears, i.e. a new link, this will generate a new local LSP in the entering node. To speed up the synchronization process in those circumstances the new LSP can be sent over one of the existing links to a neighboring node. If it is returned to the sending node over the new link then it can be assumed that the remainder of the network is already synchronized as regards the new adjacency.

Figure 6:
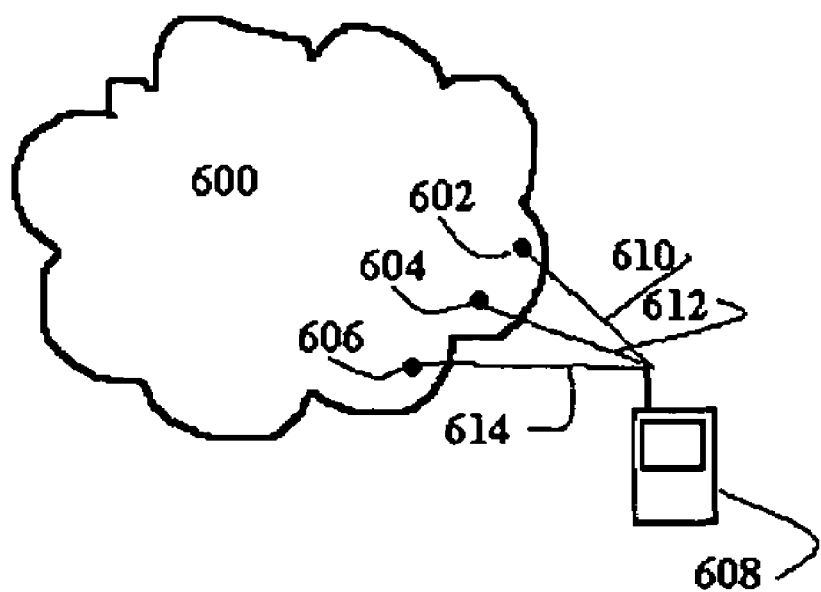
FIG. 6 is a representation of a network that illustrates a node entering a mobile network.

FIG. 6 is a schematic diagram illustrating a mobile network in relation to which the method is implemented. In particular a network is designated generally 600 includes a plurality of edge or neighbor nodes 602, 604, 606. A mobile device 608 comprising the entering node enters the range of the neighbor node 602, 604, 606 and establishes links 610, 612, 614 respectively. In the manner described above with reference to FIG. 4 or 5 the mobile device 608 identifies the synchronization domain or domains to which the neighbor nodes 602, 604, 606 belong and synchronizes with one of the neighbor nodes in each synchronization domain. As a result duplication is minimized which is particularly relevant for a mobile network as discussed in more detail above. Even though the mobile network 600 may be changing rapidly because of other changes, dynamic synchronization will be achieved. This is because the neighbor nodes 602, 604, 606 are either synchronized or are in the process of flooding a new LSP in which case the normal operation of the update process will ensure eventual synchronization.

The mechanism by which the methods and optimizations discussed above are implemented will be well known to the skilled reader and not require detailed discussion here. For example the additional code required to implement the method such as tailoring the hello messages and suppressing synchronization to avoid duplication will be apparent to the skilled reader as a simple modification of the existing code.

4.0 Implementation Mechanisms—Hardware Overview

Figure 7:
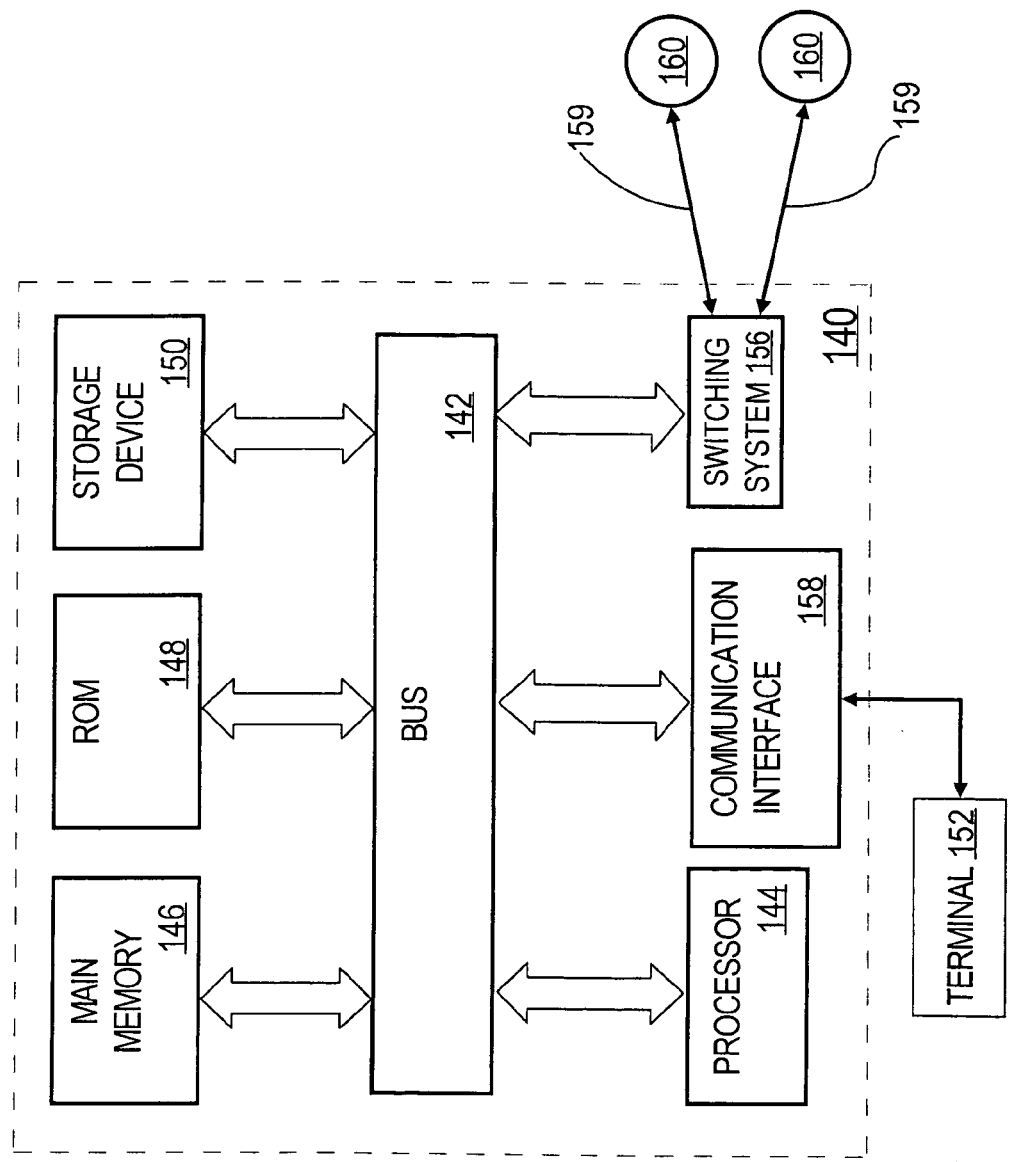
FIG. 7 is a block diagram that illustrates a computer system upon which a method for determining a repair strategy may be implemented.

FIG. 7 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as an entering or neighbor node the above described method of synchronizing a network. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

It will be appreciated that any appropriate routing protocol can be used such as Intermediate System-Intermediate System (IS-IS) or Open Shortest Path First (OSPF). Similarly any appropriate network can provide the platform for implementation of the method.

In addition the method can extend to any appropriate network change and any type of network for example a local area network (LAN).

What is claimed is:

1. A method of synchronizing a data communications network comprising a plurality of existing nodes forming one or more synchronization domains and a node entering the network, in which each existing node in a synchronization domain stores a common representation of the synchronization domain and is configured to flood the synchronization domain with domain representation information, in which, in a synchronization domain identification step performed at the entering node, the entering node exchanges entering node domain representation information with a first neighboring existing node, and identifies as a first synchronization domain common with the first neighboring existing node all neighboring existing nodes from which the entering node domain representation information is flooded back to the entering node.

2. A method as claimed in claim 1 further comprising the step, performed at the entering node, of exchanging entering node domain node representation information with a second neighboring existing node not identified as being in the first synchronization domain, if any.

3. A method as claimed in claim 2 in which the entering node exchanges entering node domain representation information with the second neighboring existing node after a timeout period following the exchange of entering node domain representation information with the first neighboring existing node.

4. A method as claimed in claim 2 in which the entering node exchanges entering node domain representation with all nodes not identified as being in the first synchronization domain simultaneously.

5. A method as claimed in claim 1 in which the entering node repeats the synchronization domain identification step successively until all synchronization domains are identified.

6. A method as claimed in claim 1 in which the synchronization domain identification exchange step comprises a synchronization step.

7. A method as claimed in claim 1 further comprising the step, performed at the entering node of selecting as the first neighboring existing node the node having the largest store of domain representation information.

8. A method as claimed in claim 7 further comprising the step, performed at the entering node, of requesting domain representation information store size in an initiation exchange with neighboring existing nodes.

9. A method as claimed in claim 1 further comprising the step, performed at the entering node, of suppressing synchronization with neighboring existing nodes prior to the synchronization domain identification step.

10. A method as claimed in claim 1 comprising the step, performed at the entering node, of sending separately identifiable entering node domain representation information to each neighboring existing node and identifying as respective synchronization domains each set of neighboring existing nodes from which commonly identified entering node domain representation information is returned.

11. A method as claimed in claim 10 in which the separately identifiable entering node domain representation information comprises a separately identifiable fragment of the entering node domain representation information.

12. A method as claimed in claim 10 further comprising the step, performed at the entering node, of synchronizing the entering node with a neighboring existing node in each synchronization domain.

13. A method as claimed in claim 1 in which the data communications network comprises a mobile network.

14. A method as claimed in claim 1 in which, where a new link appears between the entering node and the network, the entering node sends entering node domain representation information via an existing link with a neighboring node and monitors for flooding back of the entering node domain representation information via the new link.

15. A computer readable medium comprising one or more sequences of instructions for synchronizing a data communications network which instructions, when executed by one or more processors, cause the one or more processors to perform;

synchronizing a data communications network comprising a plurality of existing nodes forming one or more synchronization domains and a node entering the network, in which each existing node in a synchronization domain stores a common representation of the synchronization domain and is configured to flood the synchronization domain with domain representation information;

in a synchronization domain identification step performed at the entering node;

the entering node exchanging entering node domain representation information with a first neighboring existing node, and identifying as a first synchronization domain common with the first neighboring existing node all neighboring existing nodes from which the entering node domain representation information is flooded back to the entering node.

16. An apparatus for synchronizing a data communications network comprising a plurality of existing nodes forming one or more synchronization domains and a node entering the network, in which each existing node in a synchronization domain stores a common representation of the synchronization domain and is configured to flood the synchronization domain with domain representation information, comprising means, in a synchronization domain identification step, for exchanging entering node domain representation information with a first neighboring existing node, and means for identifying as a first synchronization domain common with the first neighboring existing node all neighboring existing nodes from which the entering node domain representation information is flooded back to the entering node.

17. An apparatus as claimed in claim 16 further comprising means for exchanging entering node domain node representation information with a second neighboring existing node not identified as being in the first synchronization domain, if any.

18. An apparatus as claimed in claim 17 in which the means for exchanging entering node domain representation information is arranged to exchange said information with the second neighboring existing node after a timeout period following the exchange of entering node domain representation information with the first neighboring existing node.

19. An apparatus as claimed in claim 17 in which the means for exchanging entering node domain representation exchanges said information with all nodes not identified as being in the first synchronization domain simultaneously.

20. An apparatus as claimed in claim 16 in which the means for exchanging entering node domain information repeats the synchronization domain identification step successively until all synchronization domains are identified.

21. An apparatus as claimed in claim 16 in which the synchronization domain identification exchange step comprises a synchronization step.

22. An apparatus as claimed in claim 16 further comprising means for selecting as the first neighboring existing node the node having the largest store of domain representation information.

23. An apparatus as claimed in claim 22 further comprising means for requesting domain representation information store size in an initiation exchange with neighboring existing nodes.

24. An apparatus as claimed in claim 16 further comprising means for suppressing synchronization with neighboring existing nodes prior to the synchronization domain identification step.

25. An apparatus as claimed in claim 16 comprising means for sending separately identifiable entering node domain representation information to each neighboring existing node and means for identifying as respective synchronization domains each set of neighboring existing nodes from which commonly identified entering node domain representation information is returned.

26. An apparatus as claimed in claim 25 in which the separately identifiable entering node domain representation information comprises a separately identifiable fragment of the entering node domain representation information.

27. An apparatus as claimed in claim 25 further comprising means for synchronizing the entering node with a neighboring existing node in each synchronization domain.

28. An apparatus as claimed in claim 16 in which the data communications network comprises a mobile network.

29. An apparatus as claimed in claim 16 in which where a new link appears between the entering node and the network, the means for exchanging entering node domain representation information sends entering node domain representation information via an existing link with a neighboring existing node and monitors for flooding back of the entering node domain representation information via the new link.

30. An apparatus for synchronizing a data communications network, the apparatus comprising:
one or more processors;
a network interface communicatively coupled to the processor and configured to communicate one or more packet flows among the processor and network; and
a computer readable medium comprising one or more sequences of instructions for synchronizing a data communications network which instructions, when executed by one or more processors, cause the one or more processors to perform;
synchronizing a data communications network comprising a plurality of existing nodes forming one or more synchronization domains and a node entering the network, in which each existing node in a synchronization domain stores a common representation of the synchronization domain and is configured to flood the synchronization domain with domain representation information;
in a synchronization domain identification step performed at the entering node;
the entering node exchanging entering node domain representation information with a first neighboring existing node, and identifying as a first synchronization domain common with the first neighboring existing node all neighboring existing nodes from which the entering node domain representation information is flooded back to the entering node.

31. A method of synchronizing a data communications network comprising a plurality of existing nodes forming one or more synchronization domains and a node entering the network, wherein each existing node in a synchronization domain stores a common representation of the synchronization domain and is configured to flood the synchronization domain with domain representation information, the method comprising the steps of:
exchanging entering node domain representation information with a first neighboring existing node as part of a synchronization domain identification process;
identifying, as a first synchronization domain common with the first neighboring existing node, all neighboring existing nodes; and
receiving node domain representation information in flooded communications from all said neighboring existing nodes.

32. The apparatus of claim 30, wherein the computer-readable medium further comprises instructions which when executed causes, at the entering node, exchanging entering node domain node representation information with a second neighboring existing node not identified as being in the first synchronization domain, if any.

33. The apparatus of claim 32, wherein the computer-readable medium further comprises instructions which when executed causes the entering node to exchange entering node domain representation information with the second neighboring existing node after a timeout period following the exchange of entering node domain representation information with the first neighboring existing node.

34. The apparatus of claim 32, wherein the computer-readable medium further comprises instructions which when executed causes the entering node to exchange entering node domain representation with all nodes not identified as being in the first synchronization domain simultaneously.

35. The apparatus of claim 30, wherein the computer-readable medium further comprises instructions which when executed causes, at the entering node, selecting as the first neighboring existing node the node having the largest store of domain representation information.

36. The apparatus of claim 30, wherein the computer-readable medium further comprises instructions which when executed causes, at the entering node, suppressing synchronization with neighboring existing nodes prior to the synchronization domain identification step.

37. The apparatus of claim 30, wherein the computer-readable medium further comprises instructions which when executed causes, at the entering node, sending separately identifiable entering node domain representation information to each neighboring existing node and identifying as respective synchronization domains each set of neighboring existing nodes from which commonly identified entering node domain representation information is returned.

38. The apparatus of claim 30, wherein the computer-readable medium further comprises instructions which when executed causes, where a new link appears between the entering node and the network, the entering node sending entering node domain representation information via an existing link with a neighboring node and monitors for flooding back of the entering node domain representation information via the new link.

\* \* \* \* \*